United States Patent
Gemeniano et al.

(10) Patent No.: US 10,149,300 B1
(45) Date of Patent: *Dec. 4, 2018

(54) DYNAMIC CUSTOMIZATION OF MOBILE COMMUNICATION DEVICE ACCESS POINT NAME (APN) SELECTION

(71) Applicant: Sprint Communications Company L.P., Overland Park, KS (US)

(72) Inventors: Glen Gemeniano, Walnut, CA (US); Roberto Murillio, Blue Springs, MO (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,617

(22) Filed: Jan. 4, 2018

Related U.S. Application Data

(63) Continuation of application No. 15/047,432, filed on Feb. 18, 2016, now Pat. No. 9,913,281.

(51) Int. Cl.
| | |
|---|---|
| *H04J 3/00* | (2006.01) |
| *H04W 72/04* | (2009.01) |
| *H04W 76/10* | (2018.01) |
| *H04W 72/08* | (2009.01) |

(Continued)

(52) U.S. Cl.
CPC .......... *H04W 72/048* (2013.01); *H04W 4/24* (2013.01); *H04W 4/60* (2018.02); *H04W 72/0453* (2013.01); *H04W 72/08* (2013.01); *H04W 76/10* (2018.02)

(58) Field of Classification Search
USPC ...... 370/336, 337, 338, 343, 347; 455/452.2
See application file for complete search history.

(56) References Cited

U.S. PATENT DOCUMENTS

| | | |
|---|---|---|
| 9,521,504 B1 | 12/2016 | Bryan et al. |
| 9,602,991 B1 | 3/2017 | Zhang et al. |
| 9,913,281 B1 | 3/2018 | Gemeniano et al. |

(Continued)

OTHER PUBLICATIONS

Office Action dated Jul. 6, 2017, U.S. Appl. No. 15/047,432, filed Feb. 18, 2016.

(Continued)

*Primary Examiner* — David Q Nguyen

(57) ABSTRACT

A user equipment (UE) comprising a processor, a non-transitory memory, wherein the non-transitory memory comprises a default access point name (APN), a cellular radio transceiver, a first mobile application, stored in the non-transitory memory, and a dynamic customization application, stored in the non-transitory memory. When executed by the processor, the dynamic customization application receives an index that associates a plurality of mobile applications to APNs via the cellular radio transceiver, wherein the index associates the first mobile application to a first APN that is different from the default APN, stores the index in the non-transitory memory, receives a request to establish a data communication session from the first mobile application, looks up the first APN in the index based on a name of the first mobile application, and establishes a data communication session over a communication channel defined by the first APN via the cellular radio transceiver.

19 Claims, 9 Drawing Sheets

(51) Int. Cl.
*H04W 4/60* (2018.01)
*H04W 4/24* (2018.01)

(56) References Cited

U.S. PATENT DOCUMENTS

| | | | | |
|---|---|---|---|---|
| 2014/0316732 | A1 | 10/2014 | Dupoteau | |
| 2015/0055633 | A1* | 2/2015 | Wu | H04W 52/346 |
| | | | | 370/336 |
| 2015/0188877 | A1* | 7/2015 | Yan | H04L 61/1511 |
| | | | | 709/245 |
| 2015/0215845 | A1* | 7/2015 | Pinheiro | H04W 48/06 |
| | | | | 455/418 |
| 2016/0277889 | A1* | 9/2016 | Enomoto | H04W 76/023 |
| 2016/0373588 | A1* | 12/2016 | Raleigh | H04M 15/61 |

OTHER PUBLICATIONS

Notice of Allowance dated Oct. 23, 2017, U.S. Appl. No. 15/047,432, filed Feb. 18, 2016.

* cited by examiner

DYNAMIC CUSTOMIZATION OF MOBILE COMMUNICATION DEVICE ACCESS POINT NAME (APN) SELECTION

CROSS-REFERENCE TO RELATED APPLICATIONS

This application claims priority as a continuation application to U.S. patent application Ser. No. 15/047,432 filed on Feb. 18, 2016, entitled "Dynamic Customization of Mobile Communication Device Access Point Name (APN) Selection," by Glen Gemeniano, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly powerful and widely used. Many mobile devices are able to download and install mobile applications, sometimes called user applications or third party applications, after the device has been purchased and activated for mobile communication service. These mobile applications may provide some of their functionality based on communicating with application servers in the Internet. Sometimes mobile applications may provide a kind of bundled service that combines functionality from multiple third party providers.

SUMMARY

In an embodiment, a user equipment (UE) is disclosed. The UE comprises a processor, a non-transitory memory, wherein the non-transitory memory comprises a default access point name (APN), a cellular radio transceiver, a first mobile application, stored in the non-transitory memory, and a dynamic customization application, stored in the non-transitory memory. When executed by the processor, the dynamic customization application receives an index that associates a plurality of mobile applications to APNs via the cellular radio transceiver, wherein the index associates the first mobile application to a first APN that is different from the default APN, stores the index in the non-transitory memory, receives a request to establish a data communication session from the first mobile application, looks up the first APN in the index based on a name of the first mobile application, and establishes a data communication session over a communication channel defined by the first APN via the cellular radio transceiver.

In another embodiment, a method of wireless communication is disclosed. The method comprises receiving an index that associates a plurality of mobile applications to access point names (APNs) by a dynamic customization application executing on a user equipment (UE) via a cellular radio transceiver of the UE, wherein the index associates a first mobile application installed in the UE to a first APN that is different from a default APN stored in the UE and storing the index by the dynamic customization application in a non-transitory memory of the UE. The method further comprises receiving a request to establish a data communication session by the dynamic customization application from the first mobile application, looking up the first APN by the dynamic customization application in the index based on a name of the first mobile application, and establishing a data communication session over a communication channel defined by the first APN by the dynamic customization application via the cellular radio transceiver.

In yet another embodiment, a method of wireless communication is disclosed. The method comprises receiving an index that associates a plurality of mobile applications to access point names (APNs) and to on-device treatment by a dynamic customization application executing on a user equipment (UE) via a cellular radio transceiver of the UE, wherein the index associates a first mobile application installed in the UE to a first APN that is different from a default APN stored in the UE and associates the first mobile application to a first on-device treatment and storing the index by the dynamic customization application in a non-transitory memory of the UE. The method further comprises receiving a request to establish a data communication session by the dynamic customization application from the first mobile application, looking up the first APN by the dynamic customization application in the index based on a name of the first mobile application, and establishing a data communication session over a communication channel defined by the first APN by the dynamic customization application via the cellular radio transceiver. The method further comprises applying the first on-device treatment to communication from the first mobile application, where the first on-device treatment is one of throttling a data throughput rate of the communication or imposing an increased level of security on the communication and wirelessly transmitting the treated communication from the first mobile application via the cellular radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
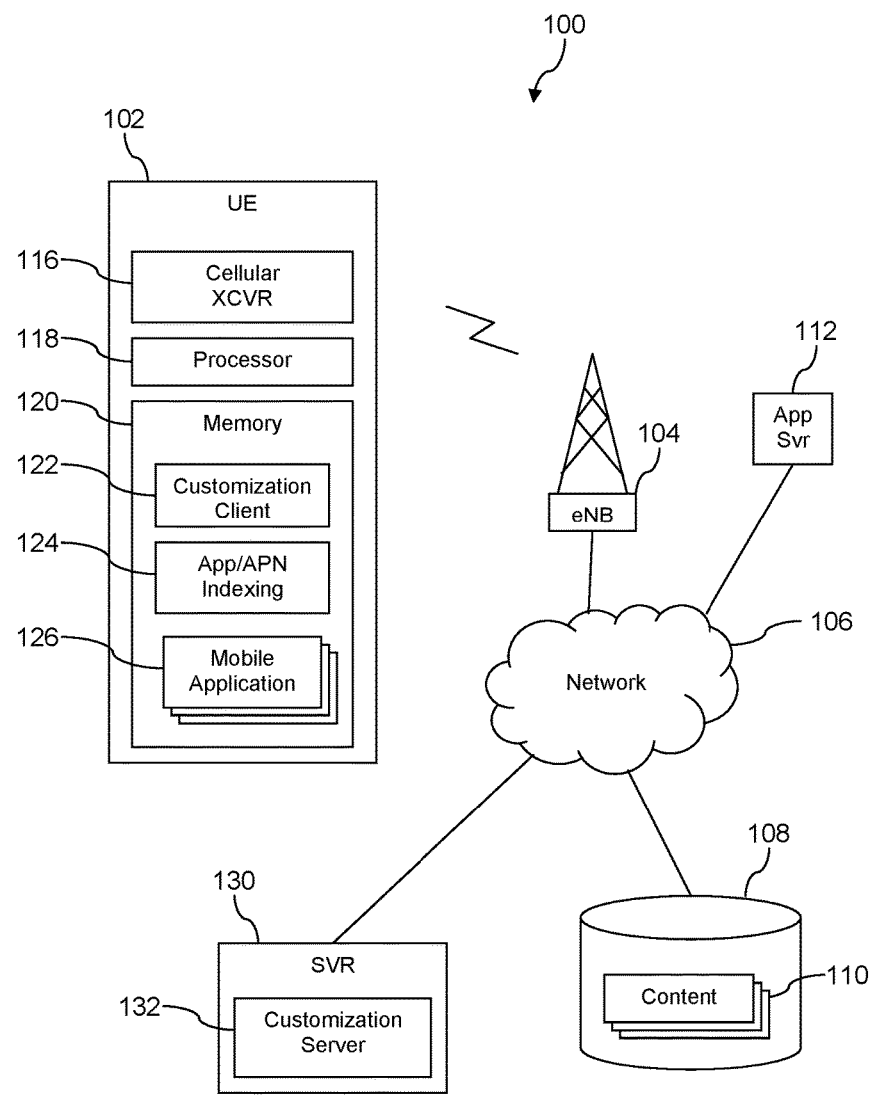
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for dynamic customization of access point name (APN) selection for mobile application communication. An APN may be used to define or identify one of a plurality of communication channels in a communication network. Traffic flowing through different communication channels may receive different treatment. For example, communication traffic flowing through a first communication channel associated with a first APN may be billed or accumulated to a data usage count of a wireless communication service account; traffic flowing through a second communication channel associated with a second APN may be unbilled (i.e., the traffic does not accumulate to the data usage count); and traffic flowing through a third communication channel associated with a third APN may receive a premium quality of service (QoS). In some contexts a communication channel associated with a premium QoS may be referred to as a premium service communication channel. Yet other treatments are contemplated by the present disclosure. As described further herein, different mobile applications executing on user equipment (UEs) may be associated with different APNs so communications originated by the applications may be provided different treatment in the communication network based on the different APNs.

A dynamic customization client executing on a UE is configured by a corresponding dynamic customization server application executing on a server computer to associate specific application package names with specific APNs. The client may be invoked when mobile applications executing on the UE request wireless communication service, may look up an APN associated with an application package name associated with the subject mobile application, and establish a wireless communication channel using the looked-up APN, thereby directing that the communication on behalf of the subject mobile application take place over the communication channel and hence receive the communication treatment corresponding to the looked-up APN.

In an embodiment, the mobile application may generally identify itself to an operating system of the UE by an installation specific identifier that is different from the application package name. The dynamic customization client may determine what application package name associates to what installation specific identifier on the particular UE and create an indexing or mapping from that installation specific identifier to an APN. In some cases, installation specific identifiers may be deemed to associate to a default APN (i.e., a generic Internet communication channel that is billed) unless the installation specific identifier has an entry in a data structure on the UE that indexes the installation specific identifier to an APN that is different from the default APN. It is understood that the index of the installation specific identifier to APN may further associate or index the installation specific identifier to the application package name. The association of the installation specific identifier to the application package name in the index may promote ease of updating association of APNs to application package names and/or installation specific identifiers.

The indexing of application package names to APNs may be updated by the dynamic customization server at any time. In an embodiment, the updating of the indexing may be performed through an open mobile alliance device management (OMA-DM) framework. It is understood that the indexing that may be downloaded to the UE may identify application package names of applications that are not installed on the UE. Said in other words, the indexing that is downloaded may be exhaustive and identify all application package names for which non-default treatment is intended and for which non-default APNs have been established by a wireless communication service provider. The dynamic customization of APNs provides the benefit of being able to update treatments provided for communications from mobile applications in a centralized way and without having to change the mobile applications themselves (without having to push out a code update of mobile applications). It is contemplated that a variety of circumstances may result in such an update. A business arrangement between a wireless service provider and a mobile application provider may change, resulting in a different association of an APN and/or communication treatment to the application package name and/or installation specific identifier. Alternatively, a communication treatment associated with an application package name and/or installation specific identifier on a specific UE may change based on a subscriber payment or lack of payment. A communication treatment associated with an application package name and/or installation specific identifier on a specific UE or group of UEs may change based on expiration of a temporary trial use period.

By contrast, formerly communication routing and/or communication treatment for traffic associated with different mobile applications may have been determined by network nodes. Changing a routing—changing an association of a mobile application to a communication treatment and/or APN—formerly involved making network changes that took about three months to test and to deploy. This association, typically, may have been accomplished based on a statically defined range of IP addresses associated with a specific mobile application. If the range of IP addresses changed or was extended, for example due to the mobile application engaging with a new collaborating service, this change would involve new network changes and entail another three month roll-out. These network changes, typically, were expensive. The system for dynamic customization of APN selection on-board the UE taught herein obviates the time delay in rolling out mobile application service changes and dramatically reduces the expense of the roll out. This can encourage the flourishing of more new mobile applications and the more rapid improvement of user mobile communication experiences.

The mechanism for indexing of application package names to APNs to drive differentiated network treatment described above may be extended to further index application package names to different on-device treatments in a consistent framework. For example, an application package name may be indexed to a specific on-device security treatment, for example employing Secure Hypertext Transport Protocol (HTTPS) messaging for content requests from a mobile application supporting law enforcement activities (for example, when the UE is employed by a police officer in performance of his or her official duties). The indexing of application package names to on-device treatment may provide the benefit of assuring the security of some mobile applications, possibly as a back-up to security requirements imposed on the mobile application during its development (e.g., back-up in case of software errors or in the case of malware subverting the security built into the mobile application).

In an embodiment, the index entries for mobile applications may include a confidential on-boarding signature that is created when the mobile application provider interworks with the mobile communication service provider to obtain communication support for his or her mobile application. When a mobile application requests wireless communication service via the dynamic customization client, the mobile application provides its installation identity and the on-boarding signature. The client, before providing access to wireless communication, checks the on-boarding signature provided by the mobile application to the on-boarding signature stored in the index entry associated with the mobile application. If the two signatures do not match, wireless service may not be allowed. Alternatively, if the two signatures do not match, wireless service may be provided using a default APN, for example using an ordinary Internet communication channel.

Turning now to FIG. 1, a system 100 is described. In an embodiment, system 100 comprises a user equipment (UE) 102, an enhanced node B (eNB) 104 or cell tower, a network 106, a data store 108 comprising content 110, and an application server 112. The UE 102 may be a mobile communication device, a mobile phone, a smart phone, a personal digital assistant (PDA), a media player, a wearable computer, a headset computer, a laptop computer, a tablet computer, or a notebook computer. The network 106 may be one or more public networks, one or more private networks, or a combination thereof.

The UE 102 may comprise a cellular radio transceiver 116, a processor 118, and a memory 120. The memory may comprise a customization client 122, an indexing 124 data structure or mapping data structure, and one or more mobile applications 126. In an embodiment, the customization client 122 may be embedded in or a component of an operating system of the UE 102. The cellular radio transceiver 116 may be able to establish wireless communication links with the eNB 104 or cell tower according to one or more of a long term evolution (LTE), a code division multiple access (CDMA), a global system for mobile communications (GSM), or a worldwide interoperability for microwave access (WiMAX) wireless communication protocol. When executed by the processor 118, a mobile application 126 may request content 110 from the data store 108 via the cellular transceiver 116, via the eNB 104, and via the network 106. Alternatively, when executed by the processor 118, a mobile application 126 may communicate with the application server 112 (for example, an application server that provides supporting services to the mobile application 126 installed on the UE 102). The network 106 may provide treatment of the network traffic associated with the data content 110 and/or the application server 112 based on an access point name (APN) identified in a data session set-up message transmitted by the UE 102, for example an APN determined by an operating system of the UE 102 based on the indexing 124. In an embodiment, the customization client 122 may determine the APN based on the indexing and cause the data session set-up message to identify the APN, or another component or software entity of the operating system may perform this function. It is understood that the system 100 may comprise any number of UEs 102, eNBs 104, data stores 108, content 110, and application servers 112.

A customization server application 132 executing on a server 130 may send the indexing of application package names to APNs to UEs 102. The indexing may be updated because a mobile application developer has approached a wireless communication service provider to provide special treatment for communication traffic associated with a mobile application 126 that the developer is deploying. For example, the developer may negotiate with the service provider an arrangement that data traffic associated with the subject mobile application 126 be unbilled (i.e., not aggregate to a data usage toll of a subscription service account associated with the UE 102). This kind of an arrangement may support rapid adoption and installation of the mobile application 126 on UEs 102 by the user community. It is understood that the data traffic associated with the subject mobile application 126, although unbilled, may not be counted for various purposes unrelated to billing a subscriber for data traffic usage.

Alternatively, the treatment instead may be a premium quality of service (QoS), for example a higher throughput to support a streaming media service associated with a mobile application 126. The indexing may define different indexing for the same application package name based on a processing state of a mobile application 126. For example, a mobile application 126 that is active on the UE 102 may be indexed to a first APN while the same mobile application 126 when it is inactive on the UE 102 may be indexed to a second APN.

In an embodiment, the customization server application 132 may send an indexing of application package names to predefined on-device processing policies or on-device treatment to the UE 102, for example to the customization client 122. The customization client 122 may store the indexing of application package names to predefined on-device processing policies in the memory 120. For example, the on-device processing policies may relate to levels of security to apply to communication between the UE 102 and the network 106 based on what mobile application 126 is engaged in the communication. For example, a mobile application 126 that supports a law enforcement officer's work may be indexed by the customization server application 132 to employ elevated communication security policies. For example, the law enforcement officer mobile application 126 may trigger the operating system of the UE 102 to employ a secure Hypertext Transport Protocol (HTTPS) messaging protocol versus an ordinary HTTP messaging protocol, using data communication port 443 instead of data communication port 80. For example, the law enforcement officer mobile application 126 may trigger the operating system of the UE 102 to encrypt data communication sent by the UE 102 to the network 106. The indexing of mobile application package names to on-device processing policies may identify other policies unrelated to security. For example, the indexing of a mobile application package name to on-device processing policy may identify a policy to throttle the throughput of data traffic output by the subject mobile application 126 to a specific number of bits per second.

When a mobile application 126 is first installed on the UE 102, the mobile application 126 may be assigned an installation specific identifier, and this installation specific identifier may be different for the same mobile application 126 installed on different UEs 102. When the mobile application 126 is first installed, the operating system may determine an application package name of the mobile application 126

(this is a uniform and consistent name for all instances of the mobile application and is defined by a mobile application developer and/or mobile application distributor) and create an association or indexing between the application package name and the installation specific identifier. Thus, the operating system is able to index from the installation specific identifier to the associated application package name and from the application package name to the associated APN and/or on-device processing policy, thereby providing the appropriate on-device processing for the mobile application 126 and/or the appropriate treatment in the network 106 by virtue of routing the data communication sessions of the subject mobile application 126 based on the selected APN.

Figure 2:
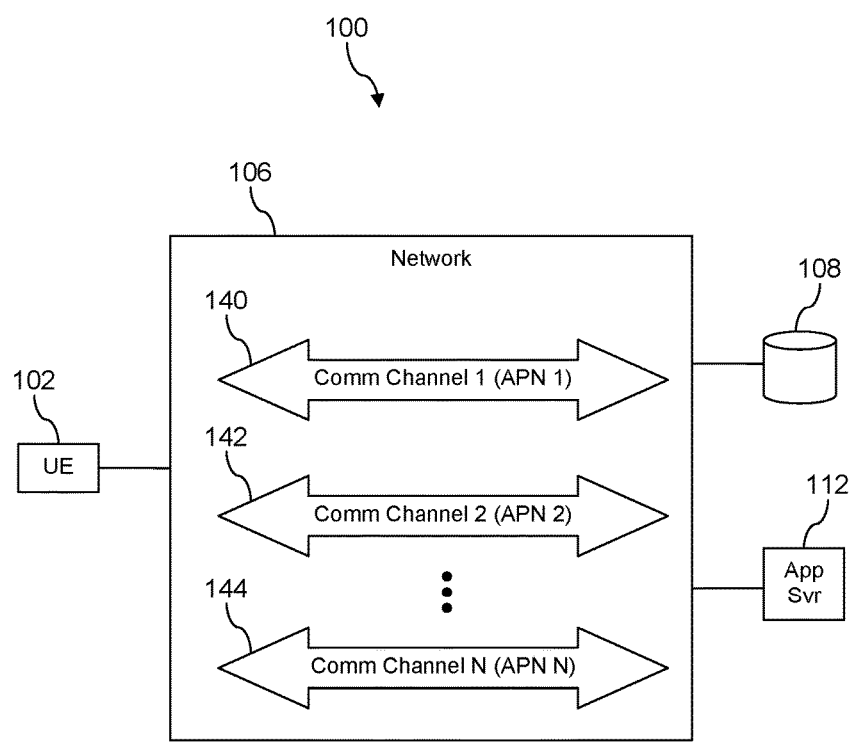
FIG. 2 is a block diagram of another abstraction of the communication system according to an embodiment of the disclosure.

Turning now to FIG. 2, an alternate abstraction of the system 100 is described. The system 100 has abstracted away some of the details of FIG. 1, for example the wireless communication link via the eNB 104 to the network 106 is replaced with a communication link to the network 106. Additionally, the communication within the network 106 is illustrated as taking place over a plurality of different communication channels, a first communication channel 140 associated with a first APN, a second communication channel 142 associated with a second APN, and a third communication channel 144 associated with a third APN. It is understood that the network 106 may support any number of communication channels associated with or defined by corresponding APNs. Each different communication channel 140, 142, 144 can provide different treatments to the communication content that is transported over the channel.

The different communication channels defined by different APNs can be used to route traffic to different end points, to provide special handling or services. The traffic can be directed to a different P-Gateway in the network 106 based on different APN, and the different P-Gateway can implement different filters to deliver special treatment or differentiated treatment to a data communication session and/or to data traffic on the subject communication channel. In an embodiment, a communication channel defined by an APN may proxy the data traffic to two different end points, for example a first endpoint defined by the mobile application 126 and/or the UE 102 and a second endpoint that provides monitoring and/or tolling processing (i.e., the traffic is duplicated and duplicate traffic is sent to the second end point).

Figure 3A:
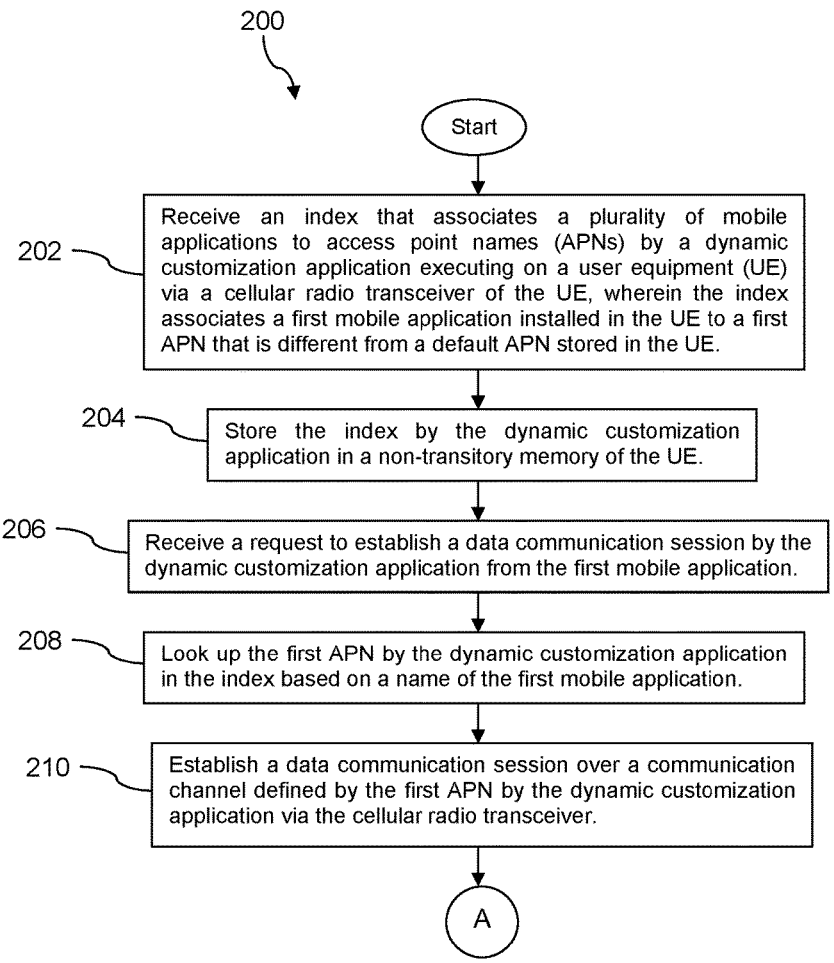
FIG. 3A and FIG. 3B is a flow chart of a method according to an embodiment of the disclosure.
Figure 3B:
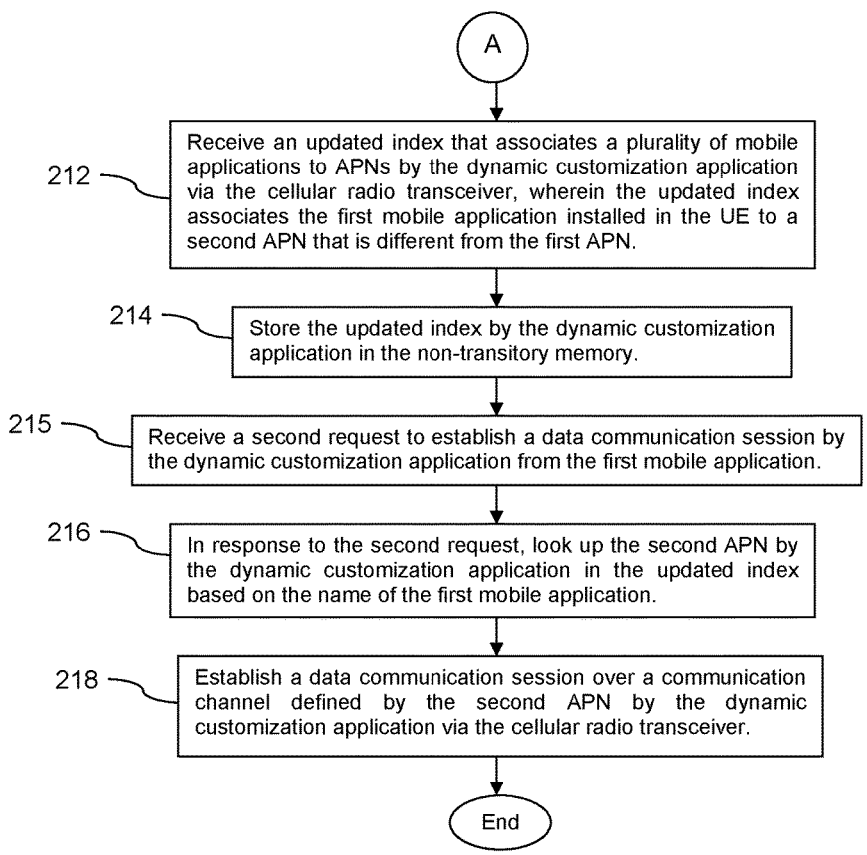

Turning now to FIG. 3A and FIG. 3B, a method 200 is described. At block 202, a dynamic customization application executing on a user equipment (UE) receives an index that associates a plurality of mobile applications to access point names (APNs) via a cellular radio transceiver of the UE, wherein the index associates a first mobile application installed in the UE to a first APN that is different from a default APN stored in the UE. The default APN may identify an Internet traffic communication channel where traffic is billed and/or tolled to a data usage count for the UE 102, and the first APN may identify a communication channel (different from the Internet traffic communication channel) where the traffic is counted but not billed and is not tolled to a data usage count for the UE 102. It is understood that updates to the index may be transmitted to the UE occasionally. The updates may be associated with new mobile applications being delivered by mobile application developers or distributors. The updates may be associated with new agreements between mobile application developers or distributors with a wireless communication service provider that maintains and/or operates the customization server application 132 and server 130.

At block 204, the dynamic customization application stores the index in a non-transitory memory of the UE. The non-transitory memory of the UE 102 may further store an indexing of installation specific names of mobile applications 126 to application package names. In combination with the indexing provided in block 202, an operating system of the UE 102 may be able to index from the installation specific name of a mobile application 126 that is requesting a data communication session to an associated application package name and from the associated package name to the associated APN, and hence index from the installation specific name of the mobile application 126 to an APN to use in establishing data communication on behalf of the subject mobile application 126.

At block 206, the dynamic customization application receives a request to establish a data communication session from the first mobile application. At block 208, the dynamic customization application (or the operating system of the UE 102) looks up the first APN in the index based on a name of the first mobile application. At block 210, the dynamic customization application establishes a data communication session over a communication channel defined by the first APN via the cellular radio transceiver.

At block 212, the dynamic customization application receives an updated index that associates a plurality of mobile applications to APNs by the dynamic customization application via the cellular radio transceiver, wherein the updated index associates the first mobile application to a second APN that is different from the first APN. At block 214, the dynamic customization application stores the updated index in the non-transitory memory of the UE. Receiving and storing the updated index may be referred to as updating the index. The updated index may be created by overwriting the previous index in the same place in the non-transitory memory. Said in other words, the updated index may refer to the same location in non-transitory memory, but the previous index values or entries have been overwritten by updated index values or entries. Some of the index values or entries may be unaltered during the update. The updating of the index may be performed, at least in part, through an OMA-DM framework. For example, the UE may be notified that an OMA-DM update is ready; the UE may go to a predefined OMA-DM server to retrieve an OMA-DM update package; and the UE may execute OMA-DM framework instructions to unpackage and activate the update—part of which comprises updating the index. In other embodiments, however, a different update index process may be followed.

At block 215, the dynamic customization application receives a second request to establish a data communication session from the first mobile application. At block 216, in response to the second request, the dynamic customization application looks up the second APN in the updated index based on the name of the first mobile application. At block 218, the dynamic customization application establishes a data communication session over a communication channel defined by the second APN via the cellular radio transceiver.

Figure 4:
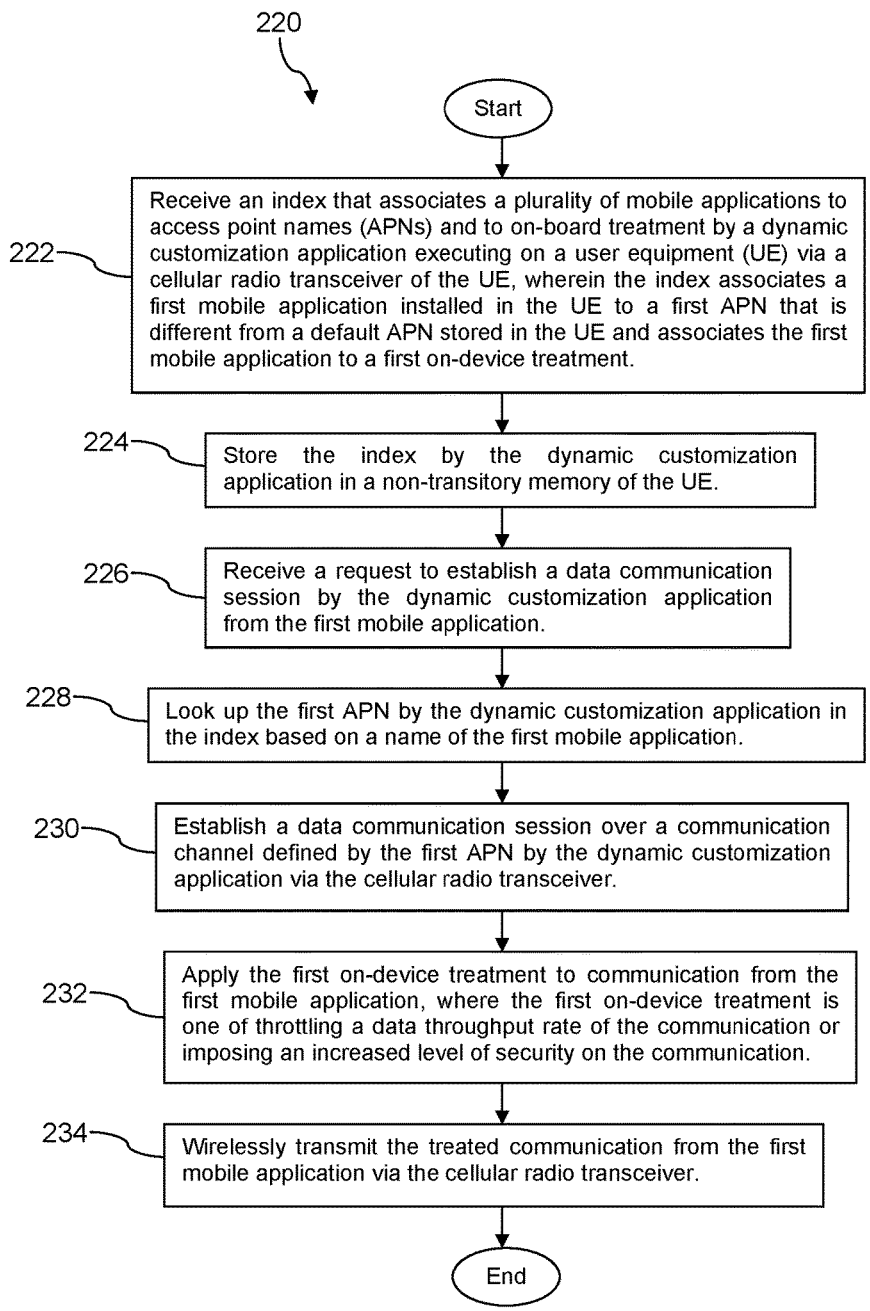
FIG. 4 is a flow chart of another method according to an embodiment of the disclosure.

Turning now to FIG. 4, a method 220 is described. At block 222, a dynamic customization application executing on a user equipment (UE) receives an index that associates a plurality of mobile applications to access point names (APNs) and to on-device treatment via a cellular radio transceiver of the UE, wherein the index associates a first mobile application installed in the UE to a first APN that is different from a default APN stored in the UE and associates the first mobile application to a first on-device treatment. At block 224, the dynamic customization application stores the index in a non-transitory memory of the UE. At block 226, the dynamic customization application receives a request to establish a data communication session from the first mobile application.

In an embodiment, the index further associates each of the mobile applications to an on-boarding signature. The on-boarding signature may be created when a mobile application provider interworks with a mobile communication service provider to establish special communication support for a given mobile application, for example premium communication service support (i.e., a premium or elevated quality of service) or unbilled communication service support. The on-boarding signature may be a kind of digital signature that is difficult to determine or guess. The request from the first mobile application to establish the data communication session may further comprise a signature. In response to receiving the request to establish the data communication session, the dynamic customization application may compare the on-boarding signature associated with the first mobile application to the signature provided in the request. If the two signatures do not match, the dynamic customization application may deny the request to establish a data communication session. Alternatively, the dynamic customization application may establish a data communication session on behalf of the first mobile application using a default APN, for example establishing a data communication session over a standard Internet communication channel, notwithstanding that the index entry for the subject mobile application may associate the first mobile application instead to a different APN. The optional step of checking for a match between a signature provided in the request by the first mobile application and an on-boarding signature provided in the associated index entry may promote avoiding spoofing of mobile applications and accessing special treatment by spoofing mobile applications.

At block 228, the dynamic customization application looks up the first in the index based on a name of the first mobile application. At block 230, the dynamic customization application establishes a data communication session over a communication channel defined by the first APN via the cellular radio transceiver. At block 232, the UE applies the first on-device treatment to communication from the first mobile application, where the first on-device treatment is one of throttling a data throughput rate of the communication or imposing an increased level of security on the communication. At block 234, the UE wirelessly transmits the treated communication from the first mobile application via the cellular radio transceiver.

Figure 5:
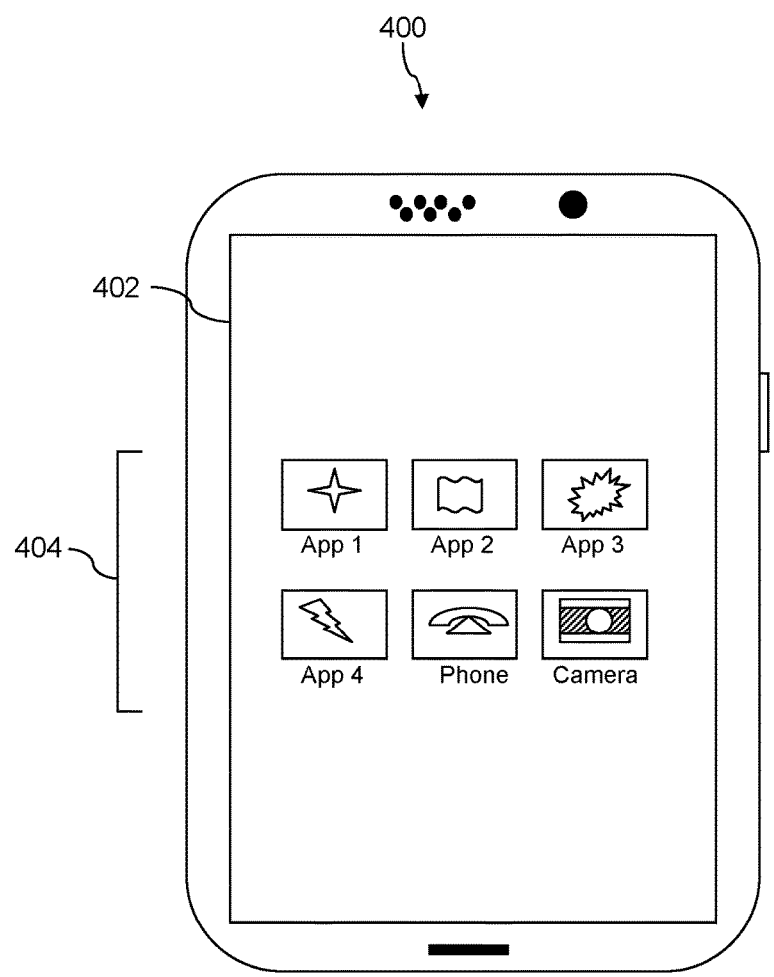
FIG. 5 is an illustration of a user equipment according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
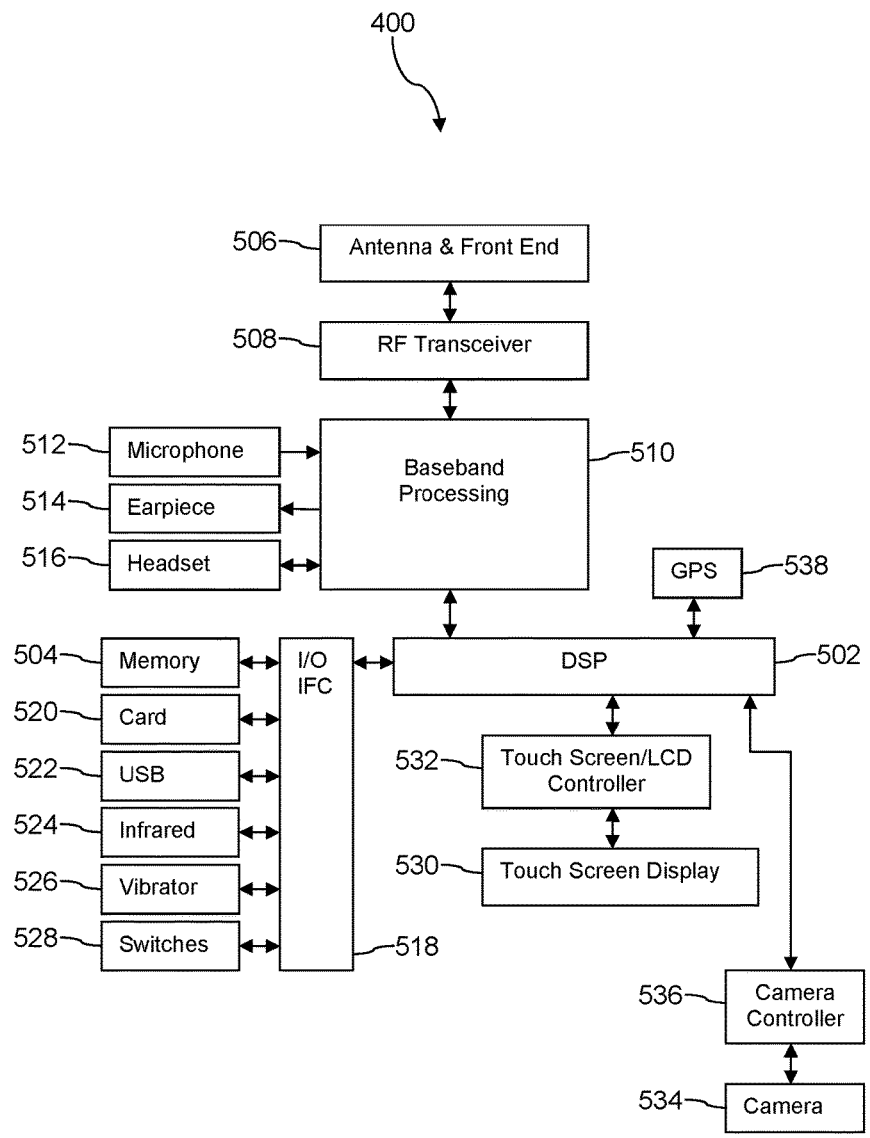
FIG. 6 is a block diagram of a hardware architecture of a user equipment according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
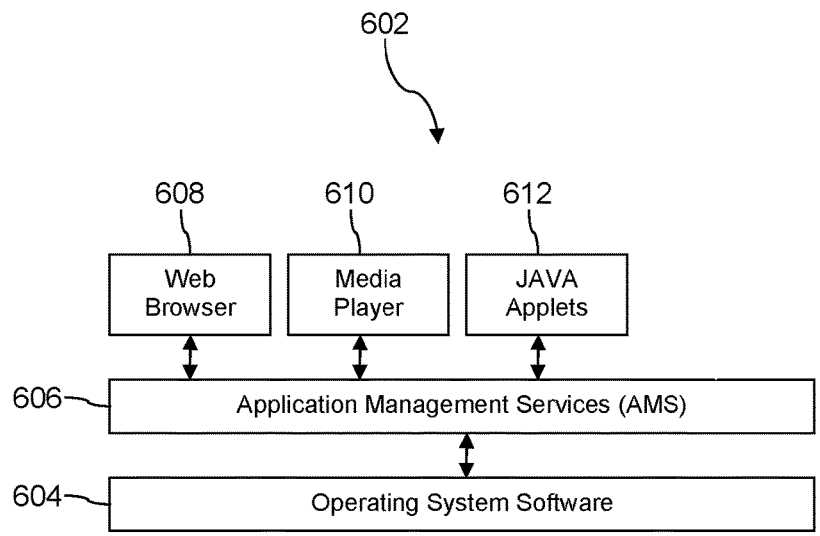
FIG. 7A is a block diagram of a software architecture of a user equipment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
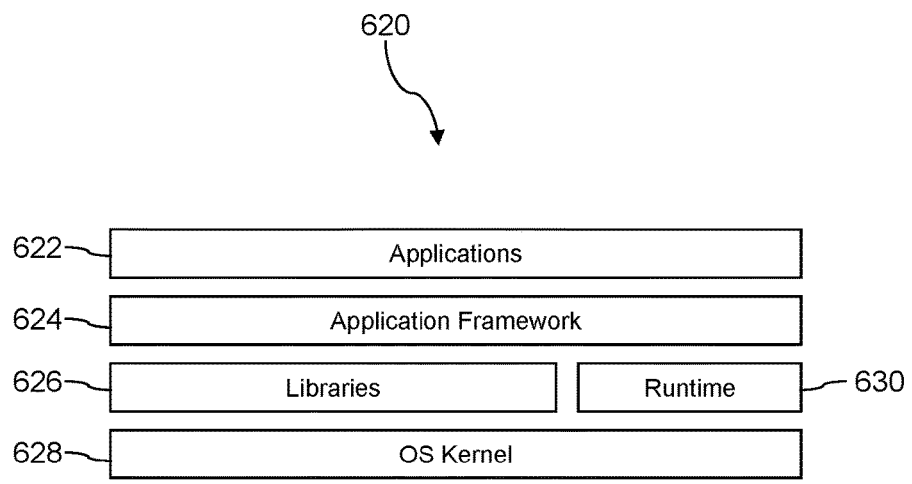
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
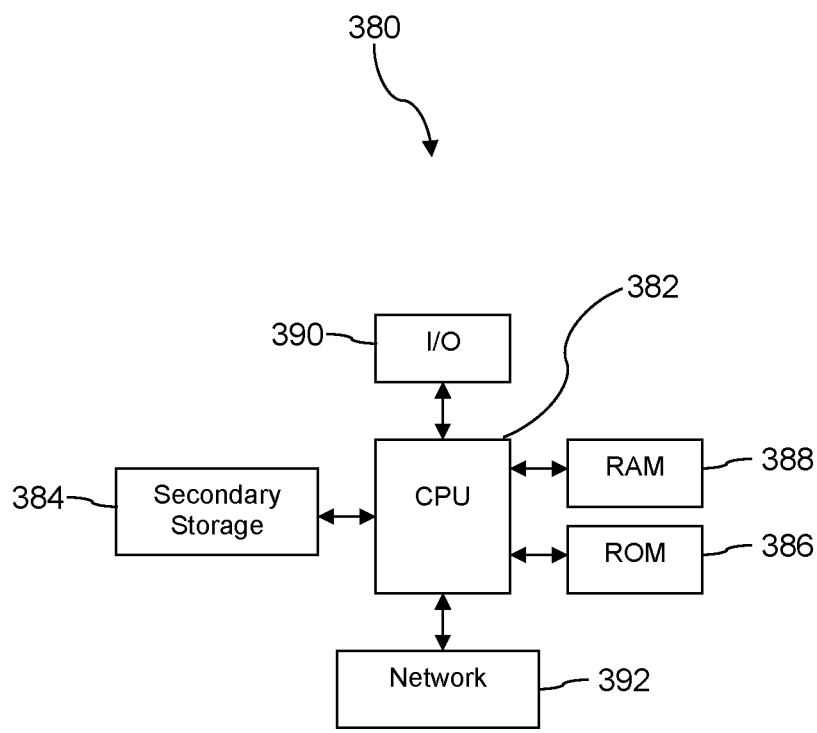
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wireless communication, comprising:
receiving an index that associates a plurality of mobile applications to access point names (APNs) by indexing of application package names to APNs and associates the plurality of mobile applications to on-device treatment by a dynamic customization application executing on a user equipment (UE) via a cellular radio transceiver of the UE, wherein the index associates a first mobile application installed in the UE to a first APN that is different from a default APN stored in the UE and associates the first mobile application to a first on-device treatment, and wherein the UE further comprises an index of at least one installation specific name of a mobile application to a corresponding application package name;
storing the index by the dynamic customization application in a non-transitory memory of the UE;
receiving a request to establish a data communication session by the dynamic customization application from the first mobile application;
looking up the first APN by the dynamic customization application in the index based on a name of the first mobile application by indexing from the installation specific name of the first mobile application to the corresponding application package name of the first mobile application and indexing from the corresponding application package name of the first mobile application to the first APN;
establishing a data communication session over a communication channel defined by the first APN by the dynamic customization application via the cellular radio transceiver;
applying the first on-device treatment in the index to communication from the first mobile application, where the first on-device treatment in the index is one of throttling a data throughput rate of the communication or imposing an increased level of security on the communication; and
wirelessly transmitting the treated communication from the first mobile application via the cellular radio transceiver.

2. The method of claim 1, wherein the index further associates each of the mobile applications to an on-boarding signature and the request to establish the data communication session further comprises a signature, and further comprising, in response to receiving the request to establish the data communication session, comparing the on-boarding signature associated with the first mobile application to the signature provided in the request by the dynamic customization application.

3. The method of claim 1, wherein the UE is a mobile communication device, a mobile phone, a smart phone, a personal digital assistant (PDA), a media player, a wearable computer, a headset computer, a laptop computer, a tablet computer, or a notebook computer.

4. The method of claim 1, wherein the first APN associates to a data communication channel that proxies the treated communication to two different endpoints.

5. The method of claim 1, wherein the first APN associates to a data communication channel that is a non-billed communication channel.

6. The method of claim 1, wherein the first APN associates to a data communication channel that is a premium service communication channel.

7. A method of wireless communication, each step of the method performed by a dynamic customization application executing on a user equipment (UE), the method comprising:
receiving, via a cellular radio transceiver of the UE, an index that associates a plurality of mobile applications to access point names (APNs) by indexing of application package names to APNs, wherein the index associates a first mobile application installed in the UE to a first APN that is different from a default APN stored in the UE, and wherein the UE further comprises an index of at least one installation specific name of a mobile application to a corresponding application package name;
storing the index in a non-transitory memory of the UE;
receiving a request to establish a data communication session from the first mobile application;
looking up the first APN in the index based on a name of the first mobile application by indexing from the installation specific name of the first mobile application to the corresponding application package name of the first mobile application and indexing from the corresponding application package name of the first mobile application to the first APN; and
establishing a data communication session over a communication channel defined by the first APN via the cellular radio transceiver.

8. The method of claim 7, wherein the default APN associates to an Internet data communication channel that is a billed communication channel.

9. The method of claim 7, wherein the first APN associates to a data communication channel that is a non-billed communication channel.

10. The method of claim 7, wherein the first APN associates to a data communication channel that is a premium service communication channel.

11. The method of claim 7, wherein the first APN associates to a data communication channel that receives a premium quality of service (QoS).

12. The method of claim 7, wherein the index received by the UE via the cellular radio transceiver further associates a plurality of mobile applications to on-device treatments.

13. A user equipment (UE), comprising:
a processor;
a non-transitory memory, wherein the non-transitory memory comprises a default access point name (APN);
a cellular radio transceiver;
a first mobile application, stored in the non-transitory memory; and
a dynamic customization application, stored in the non-transitory memory that, when executed by the processor,
receives, via the cellular radio transceiver, an index that associates a plurality of mobile applications to APNs by indexing of application package names to APNs, wherein the index associates the first mobile application to a first APN that is different from the default APN, and wherein the UE further comprises an index of at least one installation specific name of a mobile application to a corresponding application package name,
stores the index in the non-transitory memory,
receives a request to establish a data communication session from the first mobile application,
looks up the first APN in the index based on a name of the first mobile application by indexing from the installation specific name of the first mobile application to the corresponding application package name of the first mobile application and indexing from the corresponding application package name of the first mobile application to the first APN, and
establishes a data communication session over a communication channel defined by the first APN via the cellular radio transceiver.

14. The UE of claim 13, wherein the UE is a mobile communication device, a mobile phone, a smart phone, a personal digital assistant (PDA), a media player, a wearable computer, a headset computer, a laptop computer, a tablet computer, or a notebook computer.

15. The UE of claim 13, wherein the cellular radio transceiver is configured to establish a wireless communication link according to at least one of a long term evolution (LTE), a code division multiple access (CDMA), a global system for mobile communication (GSM), and a worldwide interoperability for microwave access (WiMAX) wireless communication protocol.

16. The UE of claim 13, wherein the default APN identifies a billed traffic communication channel.

17. The UE of claim 13, wherein the first APN identifies an unbilled traffic communication channel.

18. The UE of claim 13, wherein the index further associates at least one of the plurality of mobile applications to an on-device treatment.

19. The UE of claim 18, wherein the on-device treatment in the index is sending data associated with the associated mobile application over a secure Hypertext Transfer Protocol (HTTPS) communication port.

* * * * *

UNITED STATES PATENT AND TRADEMARK OFFICE
CERTIFICATE OF CORRECTION

PATENT NO.         : 10,149,300 B1
APPLICATION NO.    : 15/862617
DATED              : December 4, 2018
INVENTOR(S)        : Glen Gemeniano et al.

Page 1 of 1

It is certified that error appears in the above-identified patent and that said Letters Patent is hereby corrected as shown below:

On the Title Page

In the list of Inventors (72) the second Inventor at Column 1, Line 2 listed as 'Roberto Murillio' should be listed as: Roberto Murillo.

Signed and Sealed this
Seventeenth Day of September, 2019

Andrei Iancu
*Director of the United States Patent and Trademark Office*